United States Patent [19]

Kramer

[11] Patent Number: 4,899,045
[45] Date of Patent: Feb. 6, 1990

[54] MULTIPLE CHANNEL FIBER OPTIC CONTINUITY TEST SYSTEM

[75] Inventor: David M. Kramer, Rancho Palos Verdes, Calif.

[73] Assignee: Hi-Shear Corporation, Torrance, Calif.

[21] Appl. No.: 197,931

[22] Filed: May 24, 1988

[51] Int. Cl.$^4$ ............................................. G01N 21/88
[52] U.S. Cl. .................................. 250/227; 250/225; 356/73.1
[58] Field of Search ................ 250/227, 225; 356/73.1

[56] References Cited

U.S. PATENT DOCUMENTS 4,397,551 8/1983 Bage et al. .......................... 356/73.1

FOREIGN PATENT DOCUMENTS 0082338 4/1987 Japan .................................. 356/73.1

Primary Examiner—Edward P. Westin
Attorney, Agent, or Firm—Donald D. Mon

[57] ABSTRACT

An optical system for individually testing each one of a plurality of fibers for continuity. Each fiber having a proximal end and a distal end with a dichroic reflector at each distal end reflective of wavelengths respective to a source of testing light and transmissive to other wavelengths. The selection of which fiber is to be tested is only a matter of manipulating a rotator element which has the capacity to rotate the angle of polarization by 90 degrees. The polarization of the light determines the respective fiber to be tested.

4 Claims, 1 Drawing Sheet

MULTIPLE CHANNEL FIBER OPTIC CONTINUITY TEST SYSTEM

FIELD OF THE INVENTION

This invention relates to the testing of optical fibers for continuity.

BACKGROUND OF THE INVENTION

Optical fibers are commonly used to convey laser light for a wide variety of purposes. It is not infrequent for a single fiber with a core diameter on the order of 400 microns to be intended to carry laser light pulses for actuation purposes. Examples are ordnance firing systems. The fibers generally have a glass core with a glass cladding. They are terminated at a coupling to the user device. Depending on the configuration of the hardware, for example bulkheads and other places where a discontinuity in the fiber is required, there will be additional couplings in the optical circuit.

The optical continuity of the fiber and of the joined fibers is of utmost concern. The triggering of essential ordnance could be totally frustrated by a broken fiber or by a faulty connector. There are, of course, fiber optic systems for other uses in which continuity is also of primary importance. In all of these it is common practice to conduct frequent reliability tests.

Conventional testing techniques utilize time-domain reflectometry (TDR). These systems operate by transmitting a short pulse of light through the fiber and detecting its reflection from a dichroic mirror at the end of the fiber or at the end of a series of fibers that are coupled together. The dichroic mirror is reflective to the frequency of the test pulse, but transmissive of the frequency of the light from a firing or a signal pulse. The short period of time it takes for the pulse to traverse the fiber in two directions is known, and the receiver will see two pulses spaced a short time apart. The first pulse is light scattered from the transmitted pulse. The second pulse is the reflection from the dichroic mirror at the end of the fiber. The pulses are fed into a high speed voltage comparator which determines the pass/fail level. The pulses may be logically separated from each other to detect only the reflected pulse.

The TDR technique is used successfully for single fibers, one system for each fiber. However, there are many installations in which two or more fibers are used. For example, some laser ordnance systems require the initiation of simultaneous events. Commonly this is done with the use of two or more fibers, one respective to each event. While a test system can be provided for each of them, this soon becomes an economic burden, and in airborne systems, is an unacceptable weight penalty.

There are three common techniques for testing the continuity of systems which utilize more than one fiber. One technique is to require that both or all fibers be the exact same length. Then the reflected pulses will sum together at the detector. Practical system variables such as connector losses render this technique impractical. A reliable pass/fail level cannot be determined.

A second technique is to require the fibers to be of sufficiently different length so that separate pulse reflections can be detected for each fiber. This seriously complicates the detection circuitry and places unnecessary constraints on system design.

A third technique is to use a different wavelength laser diode for each fiber. This technique presents substantial laser and logistic problems both as to the electrical system and as to suitable dichroic mirrors for responding to the multiple wavelengths.

However complicated and troublesome, these techniques have found active use, not because they are especially good, but because they have been the best state of the art. It is an object of this invention to provide a continuity test system in which a single set-up can be used to test a plurality of optical fibers, thereby to reduce the cost and complexity of such systems, and to provide a more reliable pass/fail level.

The test system according to this invention utilizes polarized light and selector means respective to a plurality of cables, responsive to polarized light to select which of the fibers is to be tested for continuity. The selection requires only the manipulation of one optical element.

BRIEF DESCRIPTION OF THE INVENTION

A test system according to this invention utilizes a laser diode or some other source of pulsed light. It produces light which is non-polarized or has a low polarization ratio. This light is incident on a polarizer which outputs light polarized in a reference plane, and passes other light out of the system. Polarized light from the polarizer impinged upon a non-polarizing first beam splitter is partly passed out of the system, and partly reflected along a detector axis aligned with a detector and with a rotator element which has the capacity to rotate the angle of polarization by 90 degrees relative to a reference axial plane. Inserting the rotator element in the path of the light, and removing it, rotates the polarization 90 degrees each time.

A polarizing second beam splitter receives the light from the first beam splitter, directly or through the rotator, so as to produce either a reflected beam or a transmitted beam, each having a respective polarization. A fiber to be tested for continuity is aligned and optically coupled with a respective beam.

A dichroic mirror is placed at the distal end of each fiber, reflective to the test light wavelength and transmissive to operating wavelengths. Selection of which fiber is to be observed is only a matter of manipulating the rotator. The invention will be fully understood from the following detailed description and the accompanying drawings, in which:

DETAILED DESCRIPTION OF THE INVENTION

Figure 1:
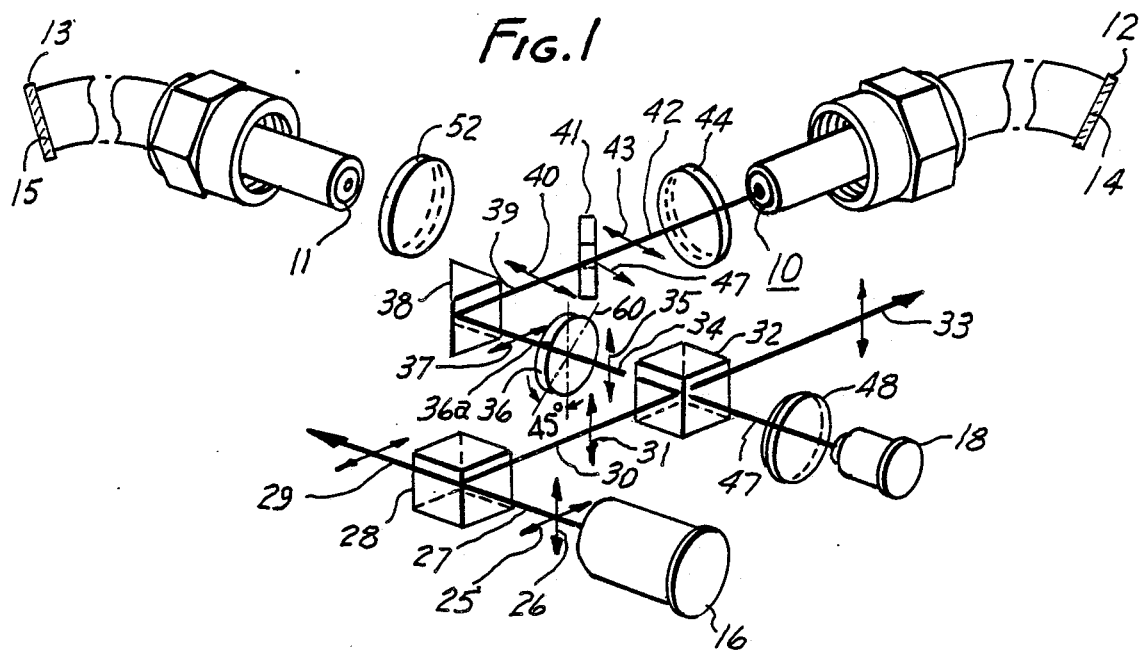
FIG. 1 is a semi-schematic drawing showing the system of the invention in one of its configurations.

The purpose of this invention is to test the conformity of a first optical fiber 10 and a second optical fiber 11. Dichroic reflectors 12, 13 are placed adjacent to the distal ends 14, 15, of fibers 10, 11, respectively. The dichroic reflectors are reflective of the wavelengths emitted by a laser diode 16 for test purposes, but are transmissive of the wavelengths of some other light source such as a different type of laser.

A detector 18 responsive to wavelengths emitted by diode 16 senses returned light of those wavelengths, and provides an output signal to circuitry (not shown) which determines whether the sensed light is received from a continuous fiber, or whether the fiber has a discontinuity.

For convenience in disclosure the term "horizontal" and "vertical" will be used herein to denote a pair of planes of polarization. These are arbitrarily selected terms, and have no necessary relationship to any terrestrial references whatever. These are merely shorthand terms to denote two axially-oriented planes which form a 90 degree dihedral angle. In the drawings, the plane of the various light beam segments is regarded as the horizontal. Arrows 25 and others that are parallel to them are parallel to or in that plane, and are denoted as horizontal. Arrows 26 and others that are parallel to them are perpendicular to that plane, and are denoted as vertical.

The laser diode emits bursts of coherent light (incoherent light may also be used, although coherent light is preferred) which are not highly polarized (sometimes called "randomly or eliptically polarized"). Arrows 25 and 26 denote its vertical and horizontal components. Any polarization may be defined by varying the relative amplitude of these two components.

The configuration of FIG. 1 is set to test the continuity of fiber 10. Beam segment 27 extends from laser diode 16 to a first polarizer 28. This polarizer is shown schematically. Its property is to pass all light, except for vertically polarized light, out beam segment 29. It reflects vertically polarized light along beam segment 30. Light on segment 29 is lost to the system. Beam segment 30 consists of reflected vertically polarized light as shown by arrows 31. Element 28 may be any type of high extinction ratio polarizer. Laser diode 16 may be oriented along the axis of beam segment 30 provided polarizer 28 is adjusted to yield vertically polarized light along beam segment 30. If a laser diode or other light source is used which produces a high polarization ratio then the polarizer 28 is not required.

Beam segment 30 impinges on a non-polarizing second beam splitter 32, which transmits part of the light along beam 33, which is lost to the system, and reflects (at 90 degrees) the remainder of the light along beam segment 34. Light in segment 34 is vertically polarized as shown by arrows 35.

In this configuration, beam segment 34 impinges on half-wave plate 36 whose property is to rotate the polarization by twice the angle between the input polarization and the optic axis 60. Since the optic axis 60 is positioned at a 45 degree angle relative to the input polarization, the output polarization is rotated by 90 degrees. Thus, the plane of polarization in beam segment 36a is now horizontal as shown by arrows 37. Light in segment 36a impinges on a total reflector 38 such as a mirror or totally reflecting prism. In turn, beam segment 39 is reflected from the reflector, remaining horizontally polarized as shown by arrows 40. Reflector 38 is provided as a means to enable the test equipment to be placed to one side of a system. Should this not be desired or necessary, reflector 38 can be eliminated and the system designed without the offset it provides.

Beam segment 39 impinges on a polarizing beam splitter 41 whose property is to pass horizontally polarized light along beam segment 42, as shown by arrows 43. It reflects vertically polarized light at a 90 degree angle, but in this system configuraton there is none to reflect, and so no light from the laser diode 16 is reflected toward second fiber 11.

A focusing lens 44 focuses light from segment 42 onto the end of fiber 10, which passes through the fiber to dichroic reflector 12, and is reflected by it back to lens 44 if there are no discontinuities in the fiber. The returning light on segment 42 is randomly polarized, meaning that it is not polarized in a single plane. This is due to the fact that the fiber is multi-mode. Returning along segment 42, it impinges on polarizing beam splitter 41, which passes only horizontally polarized light. The other light is wasted from the system by reflection along segment 47. The returning light along segment 39 is again horizontally polarized as shown by arrows 40. It is reflected by reflector 38, and impinges on rotator 36, which again rotates the polarization 90 degrees to a vertical plane as shown by arrows 35. Returning light on segment 34 impinges on beam splitter 32. Part of the light is reflected along segment 30 and is lost to the system. The remaining light is passed by beam splitter 32 to beam segment 47, which is focused by lens 48 onto detector 18.

The foregoing explains the system configuration to test fiber 10. To test fiber 11 instead, it requires only the removal of rotator 36 from the system, as will now be shown. This removal may be as simple as merely shifting rotator 36 to one side, out of the path of beam segment 34. Alternately, the rotator 36 may itself be rotated so its optic axis 60 is aligned parallel or perpendicular to the input polarization 35. These methods have the same result which is to cause no rotation of polarization.

Figure 2:
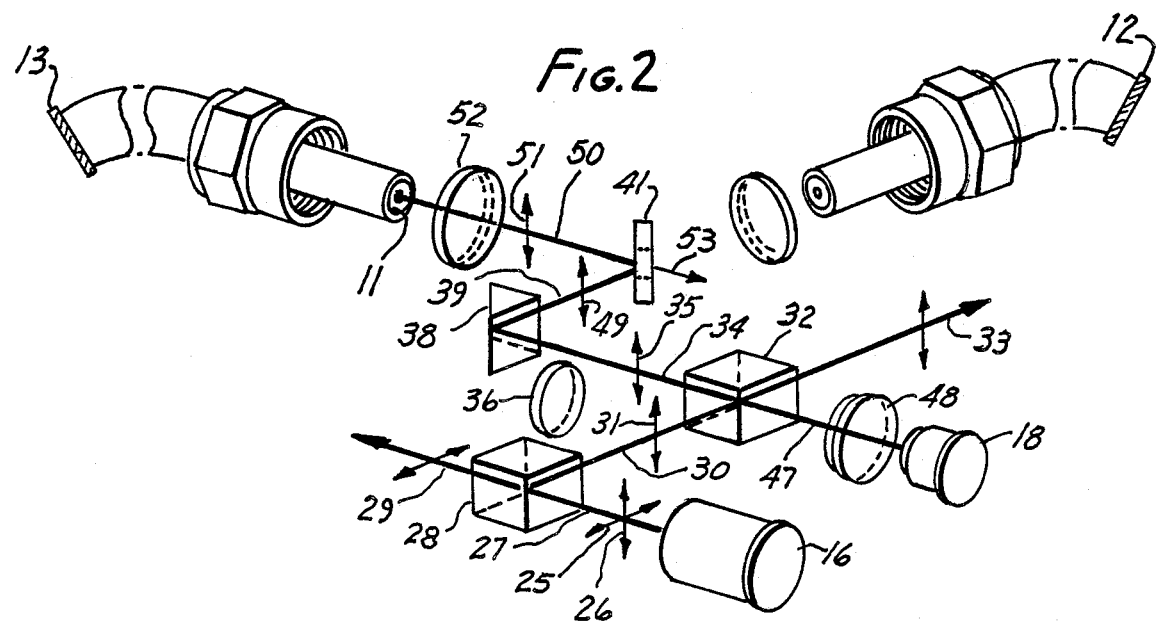
FIG. 2 is a drawing as in FIG. 1 showing the system in its other configuration.

In FIG. 2, the components and segments bear the same identifying numerals as in FIG. 1 to the extent they are common to both. In this configuration all forward optical activity is the same until beam segment 34. Now, with the rotator removed or rotated, the plane of polarization remains vertical when it impinges on reflector 38. Beam segment 39 is also vertically polarized as shown by arrows 49 (rather than horizontal as it was in FIG. 1). Light in segment 39 impinges on polarizing beam splitter 41, which as before reflects vertically polarized light, and passes horizontally polarized light. However, now there is no horizontally polarized light to pass, so no light passes to segment 42. Instead, substantially all of the light is reflected along segment 50, vertically polarized as shown by arrows 51. This light is focused by lens 52 onto fiber 11.

If the fiber has no discontinuities, this light is reflected by dichroic reflector 13, and returns to segment 50 randomly polarized. Polarizing beam splitter 41 will reflect vertically polarized light along segment 39 as shown by arrows 49. It will pass from the system horizontally polarized light along segment 53.

Light from segment 39 is reflected by reflector 38 along segment 34, and part of it is passed by beam splitter 32 to segment 47, lens 48 and detector 18. The reflected portion is lost to the system along segment 30.

From the foregoing it will be appreciated that light from the same laser diode has tested the continuity of two different fibers, the selection being accomplished by a simple mechanical motion of a single optical element. The optical components are all well-known, and their selection is merely one of convenience and function.

Circuitry to determine whether the light received by the detector is or is not respective to continuity forms no part of the invention. The invention comprises the optical arrangement which enables the selection of one fiber to be tested or the other.

This invention provides a reliable and simple testing device, useful to test a plurality of fibers without requiring separate test system for each fiber, or of discrimination techniques.

This invention is not to be limited by the embodiment shown in the drawings and described in the description, which is given by way of example and not of limitation, but only in accordance with the scope of the appended claims.

I claim:

1. An optical system for individually testing each one of a plurality of optical fibers for continuity, each said fiber having a proximal end and a distal end with a dichroic reflector at each distal end reflective of wavelengths respective to a source of testing light and transmissive to other wavelengths, said system comprising:

a source of testing light;

a first polarizing element adapted to reflect impinging light of a selected polarization along a segment, and to pass all other light out of the system, a non-polarizing first beam splitter with one axis normal to that of a source of said testing light and one axis coincident therewith, a polarizing second beam splitter having the property of transmitting only light polarized in one plane and reflecting only light polarized in a plane that forms a 90 degree dihedral angle therewith, and a polarization rotator half-wave plate in the optical path between the first beam splitter and the second beam splitter, said rotator being insertable into and removable from the optical path to determine which plane of polarization will represent light to be presented from said second polarizing beam splitter to a selected one of said fibers.

2. An optical system according to claim 1 in which a reflector is disposed between said first beam splitter and said second polarizing beam splitter to enable said source and said detector to be offset from a beam segment incident on second polarizing beam splitter.

3. An optical system for individually testing each one of a plurality of optical fibers for continuity, each said fiber having a proximal end and a distal end with a dichroic reflector at each distal end reflective of wavelengths respective to a source of testing light and transmissive to other wavelengths, said system comprising:

a source of testing light;

a first polarizing element adapted to reflect impinging light of a selected polarization along a segment, and to pass all other light out of the system, a non-polarizing first beam splitter with one axis normal to that of a source of said testing light and one axis coincident therewith, a polarizing second beam splitter having the property of transmitting only light polarized in one plane and reflecting only light polarized in a plane that forms a 90 degree dihedral angle therewith, and a polarization rotator half-wave plate in the optical path between the first beam splitter and the second beam splitter, said rotator being rotatable in the optical path to determine which plane of polarization will represent light to be presented from said second polarizing beam splitter to a selected one of said fibers 4. An optical system for individually testing each one of a plurality of optical fibers for continuity, each said fiber having a proximal end and a distal end with a dichroic reflector at each distal end reflective of wavelengths respective to a source of testing light and transmissive to other wavelengths, said system comprising:

a source of polarize testing light;

a non-polarizing first beam splitter with one axis normal to that of a source of said testing light and one axis coincident therewith, a polarizing second beam splitter having the property of transmitting only light polarized in one plane and reflecting only light polarized in a plane that forms a 90 degree dihedral angle therewith, and a polarization rotator half-wave plate in the optical path between the first beam splitter and the second beam splitter, said rotator being insertable into and removable from the optical path to determine which plane of polarization will represent light to be presented from said second polarizing beam splitter to a selected one of said fibers.

* * * * *